United States Patent
Yoon (10) Patent No.: US 9,834,199 B2
(45) Date of Patent: Dec. 5, 2017

(54) APPARATUS AND METHOD FOR CONTROLLING BATTERY STATE OF CHARGE IN HYBRID ELECTRIC VEHICLE

(71) Applicants: Hyundai Motor Company, Seoul (KR); Kia Motors Corporation, Seoul (KR)

(72) Inventor: Dong Pil Yoon, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 3 days.

(21) Appl. No.: 14/960,346

(22) Filed: Dec. 5, 2015

(65) Prior Publication Data

US 2016/0167641 A1    Jun. 16, 2016

(30) Foreign Application Priority Data

Dec. 11, 2014    (KR) .................. 10-2014-0178658

(51) Int. Cl.
*B60L 9/00* (2006.01)
*B60W 20/13* (2016.01)
(Continued)

(52) U.S. Cl.
CPC .............. *B60W 20/13* (2016.01); *B60K 6/20* (2013.01); *B60L 11/1861* (2013.01);
(Continued)

(58) Field of Classification Search
CPC ...... B60W 20/13; B60K 6/20; B60L 11/1861; B60L 2240/60; B60L 2240/642;
(Continued)

(56) References Cited

U.S. PATENT DOCUMENTS

| 6,233,508 B1 * | 5/2001 | Deguchi ............... B60W 20/11 180/65.23 |
| 2010/0010697 A1 * | 1/2010 | Soma .................... B60K 6/445 701/22 |

(Continued)

FOREIGN PATENT DOCUMENTS

| EP | 2071285 A1 | 6/2009 |
| EP | 20172740 A1 | 4/2010 |

(Continued)

*Primary Examiner* — Shardul Patel
(74) *Attorney, Agent, or Firm* — Mintz Levin Cohn Ferris Glovsky and Popeo, P.C.; Peter F. Corless (57) ABSTRACT

A method and apparatus for controlling battery state of charge (SOC) in a hybrid electric vehicle are provided to enable the efficient use of energy, the maximization of energy recovery, and the improvement of fuel efficiency and operability without the improvement of capacity and performance of electrical equipment or a main battery in a hybrid electric vehicle. The apparatus includes a collecting device that collects information regarding the slope or the road type and information regarding the vehicle speed. A controller determines charge and discharge modes based on the driving information and determines a charging upper and lower limit SOC based on the road slope or road type information a road section on which the vehicle is traveling and the vehicle speed information in the road section. A charge or discharge command is output based on the charging upper limit SOC and the charging lower limit SOC.

20 Claims, 7 Drawing Sheets

(51) Int. Cl.
| | |
|---|---|
| *B60K 6/20* | (2007.10) |
| *G06K 9/00* | (2006.01) |
| *B60L 11/18* | (2006.01) |
| *G08G 1/0962* | (2006.01) |
| *G01S 19/42* | (2010.01) |
| *G08G 1/09* | (2006.01) |
| *G08G 1/0967* | (2006.01) |

(52) U.S. Cl.
CPC ..... *G06K 9/00818* (2013.01); *G08G 1/09623* (2013.01); *G08G 1/09626* (2013.01); *B60L 2240/60* (2013.01); *B60L 2240/642* (2013.01); *B60L 2240/68* (2013.01); *B60Y 2200/10* (2013.01); *G01S 19/42* (2013.01); *G08G 1/091* (2013.01); *G08G 1/096775* (2013.01); *Y02T 10/7005* (2013.01); *Y02T 10/705* (2013.01); *Y02T 10/7044* (2013.01); *Y02T 10/7291* (2013.01); *Y02T 10/92* (2013.01); *Y02T 90/16* (2013.01); *Y10S 903/903* (2013.01)

(58) Field of Classification Search
CPC ............ B60L 2240/68; G06K 9/00818; G06K 9/3258; G08G 1/096708; B60Y 2200/10; B60Y 2300/91; B60Y 2400/303; B60Y 2400/61; G01S 19/42; Y02T 10/7005; Y02T 10/7044; Y02T 10/705; Y02T 10/7291; Y02T 10/84; Y02T 10/92; Y02T 90/16; Y10S 903/903
USPC .......... 701/1, 22, 70, 400; 340/905; 903/903
See application file for complete search history.

(56) References Cited

U.S. PATENT DOCUMENTS

| | | | | |
|---|---|---|---|---|
| 2010/0131139 | A1* | 5/2010 | Sakai ...................... | B60K 6/46 701/22 |
| 2010/0138098 | A1* | 6/2010 | Takahara .............. | B60L 11/123 701/31.4 |
| 2010/0165102 | A1* | 7/2010 | Klebanov .............. | B60Q 1/115 348/135 |
| 2010/0283855 | A1* | 11/2010 | Becker ................. | G06K 9/6807 348/148 |
| 2013/0332020 | A1* | 12/2013 | Uchihara .............. | B60W 20/12 701/22 |
| 2014/0032072 | A1* | 1/2014 | Yoshihama ............... | B60T 7/18 701/70 |
| 2014/0324261 | A1* | 10/2014 | Amano ................. | B60L 11/123 701/22 |
| 2015/0028742 | A1* | 1/2015 | Imaeda .................. | B60Q 1/143 315/82 |

FOREIGN PATENT DOCUMENTS

| | | |
|---|---|---|
| EP | 2774802 A1 | 9/2014 |
| JP | 08-126116 A | 5/1996 |
| JP | 11-008909 A | 1/1999 |
| JP | 2001-298805 A | 10/2001 |
| JP | 2009-029154 A | 2/2009 |
| JP | 2012-130213 A | 7/2012 |
| JP | 5102101 B2 | 12/2012 |
| JP | 2013-005485 A | 1/2013 |
| KR | 10-0896216 B1 | 5/2009 |
| KR | 2012-0060631 A | 6/2012 |
| WO | 2013/108246 A2 | 7/2013 |

\* cited by examiner

APPARATUS AND METHOD FOR CONTROLLING BATTERY STATE OF CHARGE IN HYBRID ELECTRIC VEHICLE

CROSS-REFERENCE TO RELATED APPLICATION

This application claims under 35 U.S.C. §119(a) the benefit of Korean Patent Application No. 10-2014-0178658 filed Dec. 11, 2014, the entire contents of which are incorporated herein by reference.

BACKGROUND (a) Technical Field

The present invention relates to a method for controlling battery State of Charge (SOC) in a hybrid electric vehicle. More particularly, the present invention relates to a method for controlling battery state of charge in a hybrid electric vehicle, which enables the efficient use of energy, the maximization of energy recovery by a motor, and the improvement of fuel efficiency and operability without the improvement of capacity and performance of electrical equipment (drive motor, Hybrid Starter and Generator (HSG), etc.) or a main battery in a hybrid electric vehicle.

(b) Background Art

Generally, internal combustion engine vehicles that use fossil fuels such as gasoline and diesel have a variety of limitations such as environmental contamination caused by the engine exhaust, global warming caused by carbon dioxide, and respiratory illnesses caused by creation of ozone. Accordingly, vehicles driven by electric power i.e., eco-friendly vehicles such as electric vehicles (EVs) driven by a motor and hybrid electric vehicles (HEVs) driven by an engine and a motor are being developed. In particular, electric vehicles and hybrid electric vehicles are equipped with a motor used as a driving source for vehicle running, an inverter and a motor controller (e.g., Motor Control Unit (MCU)), and a battery (usually referred to as 'main battery' or 'high-voltage battery') configured to supply a motor with driving power.

Additionally, electric vehicles and hybrid electric vehicles are equipped with a battery controller (e.g., Battery Management System (BMS)) configured to collect battery information. The battery controller is configured to collect battery information regarding the voltage, current, temperature, State of Charge (SOC) (%) of a battery, and is directly involved in charge and discharge control of a battery using the battery information or provides the battery information for other controllers within or extraneous a vehicle to allow the other controllers to use the battery information for the purpose of vehicle control or battery charge/discharge control.

Further, hybrid electric vehicles are equipped with an engine together with a motor (hereinafter, referred to as a 'drive motor') as driving sources, and a Hybrid Starter and Generator (HSG) power-transmittably connected to the engine to start the engine or generate electricity using power delivered from the engine. A main battery (e.g., high-voltage battery) used a power source of the drive motor is chargeably/dischargeably connected to the drive motor and the HSG via an inverter. The inverter is configured to convert a direct current of the battery into a three-phase alternating current (AC) for the driving of the drive motor, and apply the three-phase alternating current to the drive motor (e.g., battery discharge).

Such hybrid vehicles either drive in an electric vehicle (EV) mode which is a pure electric vehicle mode using the driving power of the drive motor, or in hybrid electric vehicle (HEV) mode which uses both driving powers of the engine and the drive motor. In addition, the regenerative mode that recovers braking or the inertial energy through the power generation of the motor during the braking of a vehicle or the coasting of a vehicle by inertia and charges power into the battery is performed. The HSG also charges the battery by operating as a generator by its own power of the engine or operating as a generator by the power delivered through the engine under the energy regenerative condition.

Meanwhile, in typical eco-friendly vehicles, the charge and discharge of a battery is adjusted based on the available output of the main battery and the required output necessary for current driving regardless of information of the vehicle speed and the road slope on the driving path. In particular, when a vehicle enters a uphill road or a low-speed section, or when a vehicle enters a downtown or a congested section and when the battery state of charge (hereinafter, referred to as 'SOC') (%) is low, an available motor torque is limited upon EV driving reduction and acceleration/deceleration, generating an increase of a transient control section and thus reducing the energy efficiency and operability (e.g., charge amount at idle and inefficiency operating point increases).

Further, when a vehicle enters a downhill road or a middle/high-speed section or when a vehicle enters a highway or an expressway, when the battery SOC (%) is high, an available batter space for charge is deficient upon regenerative braking and coast regeneration, making it difficult to recover extra regenerative energy and thus wasting the regenerative energy. Particularly, when there is frequent regenerative braking for maintaining a vehicle at a constant speed, or when a vehicle travels on a long-distance deceleration or downhill road such as the outlet of an expressway, regenerative energy may not be recovered and may be wasted.

In the related art, since the slope of a driving road is predicted from a signal of an accelerator (e.g., acceleration pedal) position sensor (APS), an output, a vehicle speed, or a signal of a G sensor (e.g., acceleration sensor) to determine a SOC control strategy or since the SOC control strategy is determined based on an APS signal, a brake pedal position sensor (BPS), or vehicle speed, an increase of a transient control section may occur and thus reductions of fuel efficiency and operability may be incurred due to misdetermination or determination delay according to variations (e.g., change of road load, change of acceleration or deceleration situation) of vehicle driving conditions during control section determination.

The above information disclosed in this section is merely for enhancement of understanding of the background of the invention and therefore it may contain information that does not form the prior art that is already known in this country to a person of ordinary skill in the art.

SUMMARY

The present invention provides a method for controlling battery State of Charge (SOC) in a hybrid electric vehicle, which enables the efficient use of energy, the maximization of energy recovery by a motor, and the improvement of fuel efficiency and operability without the improvement of capacity and performance of electrical equipment (e.g., drive motor, Hybrid Starter and Generator (HSG), etc.) or a main battery in a hybrid electric vehicle.

The present invention also provides a method for controlling battery SOC in a hybrid electric vehicle, which may improve the fuel efficiency by maximizing energy recovered by a motor upon braking or coasting of a vehicle on a downhill road, a highway, or middle/high-speed driving sections The present invention further provides a method for controlling battery SOC in a hybrid electric vehicle, which may improve both operability and fuel efficiency by sufficiently securing the motor output while the vehicle is traveling on an uphill road or in a downtown or while traveling in a low-speed and congested section, thereby securing a rapid response performance with respect to a substantial required torque upon steep slope or rapid acceleration and increasing the EV travelling distance.

Additionally, the present invention provides a method for controlling battery state of charge in a hybrid electric vehicle, which may prevent reduction of operability and fuel efficiency by predicting the front slope, road type and traffic situation and thus minimizing the transient state based on the change of vehicle speed, road type, or road slope. The present invention also provides a method for controlling battery SOC in a hybrid electric vehicle, which may improve the durability of a main battery and prevent the driving disabled state of a vehicle, by predicting and restricting excess of predetermined charge and discharge limits during the charge of the main battery.

In one aspect, the present invention provides an apparatus for controlling battery State of Charge (SOC) in a hybrid electric vehicle, that may include: a driving information or road information collecting device configured to collect driving information or road information including information regarding the slope or the type of a road and information regarding the speed of a vehicle on a road; a driving information collecting device configured to collect driving information of a vehicle; and a vehicle controller configured to determine a charge mode and a discharge mode based on the driving information and determine a charging upper limit SOC and a discharging lower limit SOC based on the road slope information or the road type information of a road section on which a vehicle is traveling and the vehicle speed information in the road section, to output a charge command or a discharge command with respect to a drive motor and a hybrid starter and generator (HSG) based on the charging upper limit SOC where battery charging stops in the charge mode and the discharging lower limit SOC where battery charging starts in the discharge mode.

In another aspect, the present invention provides a method for controlling battery State of Charge (SOC) in a hybrid electric vehicle that may include: acquiring, from data received from a driving information or road information collecting device, driving information or road information including information regarding the slope or the type of a road and information regarding the speed of a vehicle on a road; acquiring driving information of a vehicle from the driving information collecting device; determining a charge mode and a discharge mode based on the driving information; determining, in a charge mode, a charging upper limit SOC based on road slope information and road type information of a road section on which a vehicle is currently traveling and vehicle speed information in the road section, or determining, in a discharge mode, a discharging lower limit SOC based on road slope information and road type information of a road section and vehicle speed information in the road section; and outputting a charge command or a discharge command with respect to a drive motor and a hybrid starter and generator (HSG) based on the charging upper limit SOC where battery charging stops in the charge mode or the discharging lower limit SOC where battery charging starts in the discharge mode.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

1: external traffic information providing system
  10: Driving Information or Road Information collecting device
  11: GPS receiver
  12: data storage unit
  13: information receiver
  14: camera sensor
  15: sensor controller
  20: battery controller
  21: battery
  30: driving information collecting device
  40: vehicle controller
  50: motor controller
  51: electrical equipment (drive motor and HSG)
  60: engine controller
  61: engine It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, exemplary embodiments of the present invention will be described in detail with reference to the accompanying drawings so that those skilled in the art can easily carry out the present invention.

The present invention provides a method for controlling battery state of charge (hereinafter, referred to as 'SOC') in a hybrid electric vehicle, which enables the efficient use of energy, the maximization of energy recovery, and the improvement of fuel efficiency and operability without the improvement of capacity and performance of electrical equipment or a main battery in a hybrid electric vehicle. In particular, the electrical equipment relates to battery charge/discharge in a hybrid electric vehicle, and may include a hybrid starter and generator (HSG) and a drive motor that may be configured to convert braking and inertial energy of a vehicle into electric energy to charge a battery during regenerative braking or coasting.

Figure 1:
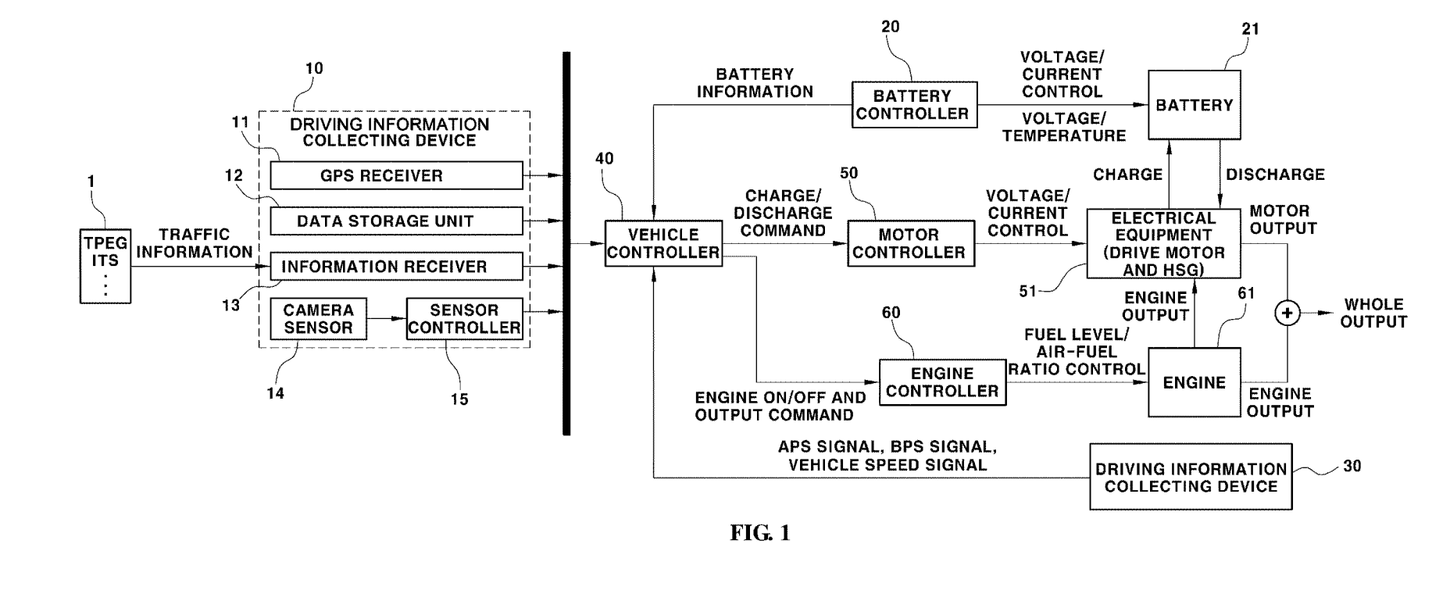
FIG. 1 is a view illustrating a system for controlling batter State of Charge (SOC) according to an exemplary embodiment of the present invention.

FIG. 1 is a view illustrating a system for controlling batter SOC according to an exemplary embodiment of the present invention. Referring to FIG. 1, the system may include a driving information or road information collecting device 10 (e.g., a sensor) configured to collect driving information or road information including information regarding a driving road, a battery controller 20 configured to collect battery information such as battery voltage (e.g., cell voltage), current, temperature and SOC (%), a driving information collecting device 30 (e.g., a sensor) configured to collect vehicle driving information, and a vehicle controller 40 configured to determine and output battery charge/discharge commands based on the driving information or road information, the battery information, and the driving information.

In particular, the driving information or road information may be collected based on the current location of a vehicle, and may include the slope information and the traffic speed (or limited speed) of the current road, the slope information of the front road and the residual distance to the front road. The slope information of the current road may be slope information of a current road section on which a vehicle is traveling, and the traffic speed information may be an average vehicle running speed determined based on the real-time traffic volume in a current road section on which a vehicle is traveling.

The driving information or road information collecting device 10 configured to collect the driving information or road information may include a global positioning system (GPS) receiver 11 configured to receive a GPS signal, a data storage unit 12 configured to store map information, and an information receiver 13 configured to receive traffic information from a traffic information providing system 1 extraneous to a vehicle. In particular, the map information may provide three-dimensional (3D) geographic information, i.e., three-dimensional road information including altitude on the two-dimensional plane, and particularly, may be 3D map data that may provide in real-time the slope information of a road while a vehicle is being driven.

In particular, the three-dimensional map data may be a map database of an advanced driver assistance system (ADAS) mounted within a vehicle. The GPS receiver 11 and the data storage unit 12 may be a navigation device installed within a vehicle. When the vehicle controller 40 detects the location of a vehicle from a GPS signal received from GPS receiver 11, the road slope information of the road section may be obtained from the map information stored in the data storage unit 12 based on the location of a vehicle.

Additionally, when a driver sets a destination on a navigation device and then a driving path to a destination is generated, road slope information on the driving path may be acquired from 3D map data. The road on the driving path may be divided into different sections, and road slope information for each section may be acquired. In this exemplary embodiment, slope information of a road section (e.g., road section that corresponds to the detected location of a vehicle) on which a vehicle is currently traveling, and slope information of the front road section adjacent or proximate to the current road section may be acquired and used.

In this exemplary embodiment, the vehicle controller 40 may be configured to acquire and use a mean slope value of each road section as the slope information of the current road section on which a vehicle is traveling and the slope information of the front road section. Hereinafter, the mean slope value of the current road section will be referred to as 'current mean effective road slope', and the mean slope value of the front road section will be referred to as 'next mean effective road slope'.

When the driving information or road information collecting device 10 collects the traffic speed information of a road on which a vehicle is traveling and the information receiver 13 receives traffic information from the external traffic information providing system (TPEG, ITS, etc.) 1, the vehicle controller 40 may be configured to acquire, from the traffic information received from the information receiver 13, traffic speed information of a road on which a vehicle is traveling, based on the vehicle location detected from the GPS signal.

When traffic information may not be provided by the external traffic information providing system based on area restrictions, limited speed regulated on a road on which a vehicle is currently traveling may be used. In other words, the traffic speed, i.e., the mean vehicle running speed according to the traffic of a road may be primarily used, and the limited speed regulated on the road on which a vehicle is traveling may be secondarily used. When the traffic speed information on a road is provided, the traffic speed may be used, and when the traffic speed information is not provided, the limited speed may be used.

Further, even though the running formation collecting device 10 provides the traffic information and the limited speed on the road, the actual current running speed may be different from the limited speed by a certain degree or more, or there may be multiple roads and all of the traffic information and the limited speed of which may not be provided. Accordingly, in this case, the mean vehicle speed for a particular time may be used from the vehicle speed detector that detects the current speed of a vehicle. The limited speed may be acquired from the vehicle location and the map information by the vehicle controller 40, and information regarding the limited speed regulated on a road that corresponds to the vehicle location may be extracted from the map information.

When an imaging device (e.g., camera, video camera, or the like) sensor 14 captures a traffic sign marked with the limited speed while the vehicle is being driven, a sensor controller 15 may be configured to extract information regarding the limited speed from a captured (e.g., photographed) image using character recognition, and the limited speed information extracted by the sensor controller 15 may be delivered to the vehicle controller 40 to be analyzed.

As described above, one of the traffic speed that is a mean vehicle running speed of a driving road provided by the external traffic information providing system 1, the limited speed regulated on the driving road, and the mean vehicle speed for a particular time from the vehicle speed detector of a vehicle may be used. Hereinafter, the traffic speed, the limited speed, and the actual mean vehicle speed will be referred to as a 'mean effective vehicle speed' in this disclosure.

In addition, the driving information or road information collecting device 10 may be configured to provide the vehicle controller 40 with information regarding the residual distance from the current location of a vehicle to the location of the front road section, and the residual distance information may be acquired from the location information of a vehicle and the map information. The driving information collecting device 30 configured to collect the vehicle driving information may include an accelerator pedal position sensor (APS) configured to sense an operation of an accelerator pedal (e.g., an engagement degree, an amount of pressure exerted onto the pedal, etc.), a brake pedal position sensor (BPS) configured to sense an operation of a brake pedal (e.g., an engagement degree, an amount of pressure exerted onto the pedal, etc.), and a vehicle speed detector configured to detect the current speed of a vehicle.

A motor controller 50 may be configured to receive charge/discharge commands output from the vehicle controller 40, and may be configured to operate the electrical equipment 51 (i.e., the drive motor and the HSG that are an in-vehicle motor and an generator into driving (battery discharge)) and generative (e.g., power generation and battery charge) modes through voltage/current adjustment based on the commands. In addition, the motor controller 50 may be configured to adjust the driving output and power generation output of the drive motor and the HSG. An engine controller 60 may be configured to adjust the amount of fuel and air based on whether the engine is on or off and output commands output from the vehicle controller 40, and thus may be configured to adjust the output of an engine 61.

Figure 2:
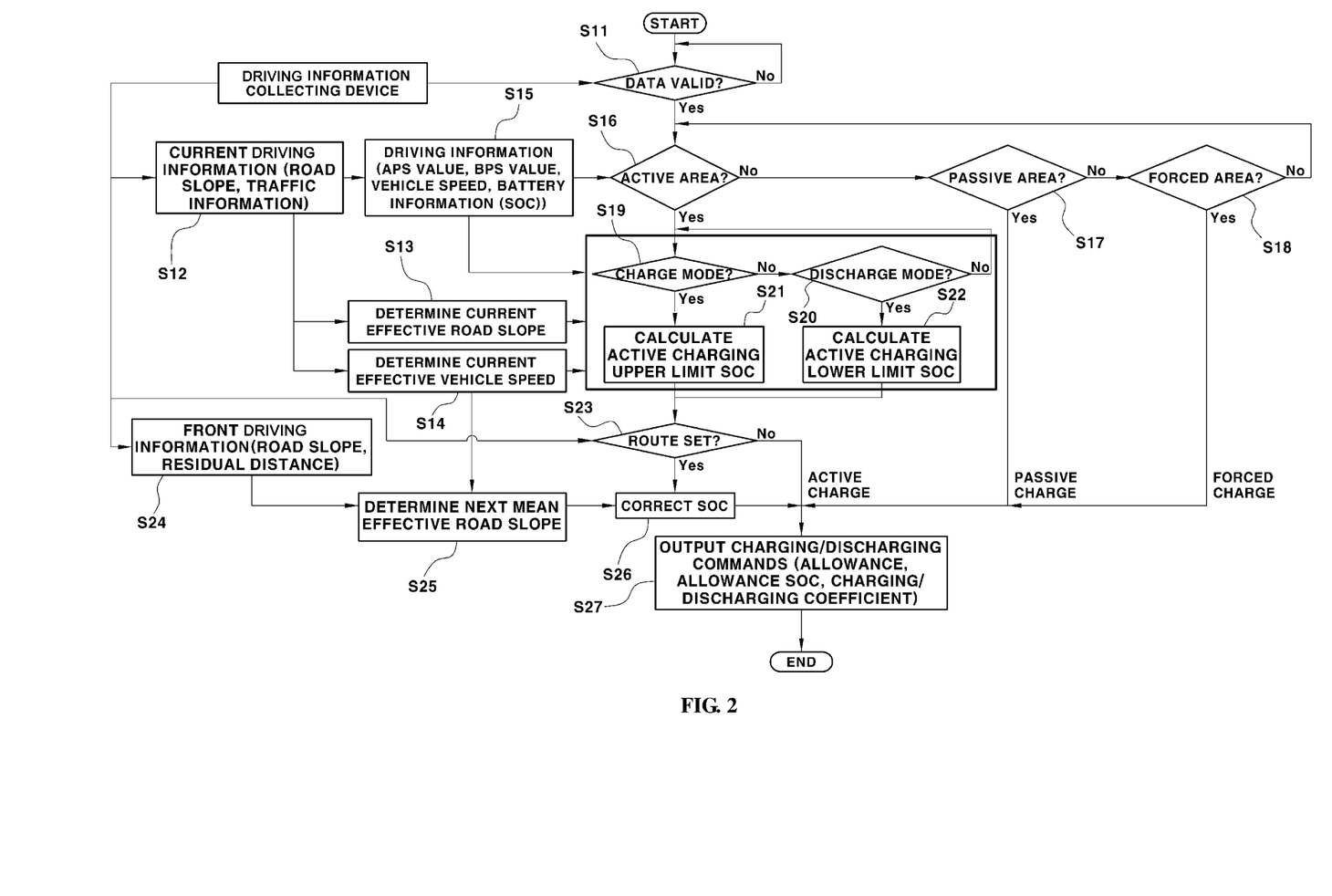
FIG. 2 is a flowchart illustrating a process of controlling battery SOC according to an exemplary embodiment of the present invention.
Figure 3:
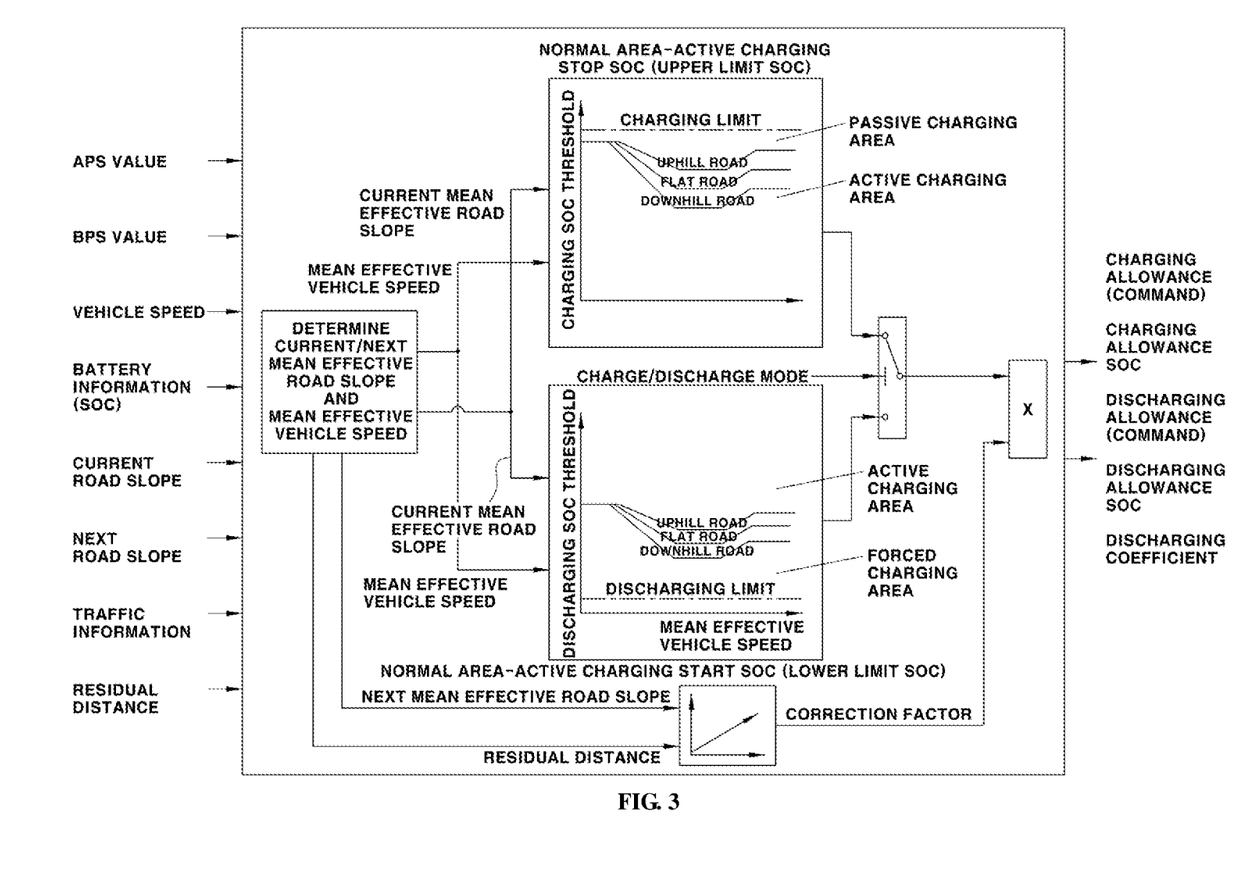
FIG. 3 is a view illustrating a method of controlling battery SOC according to an exemplary embodiment of the present invention.
Figure 4:
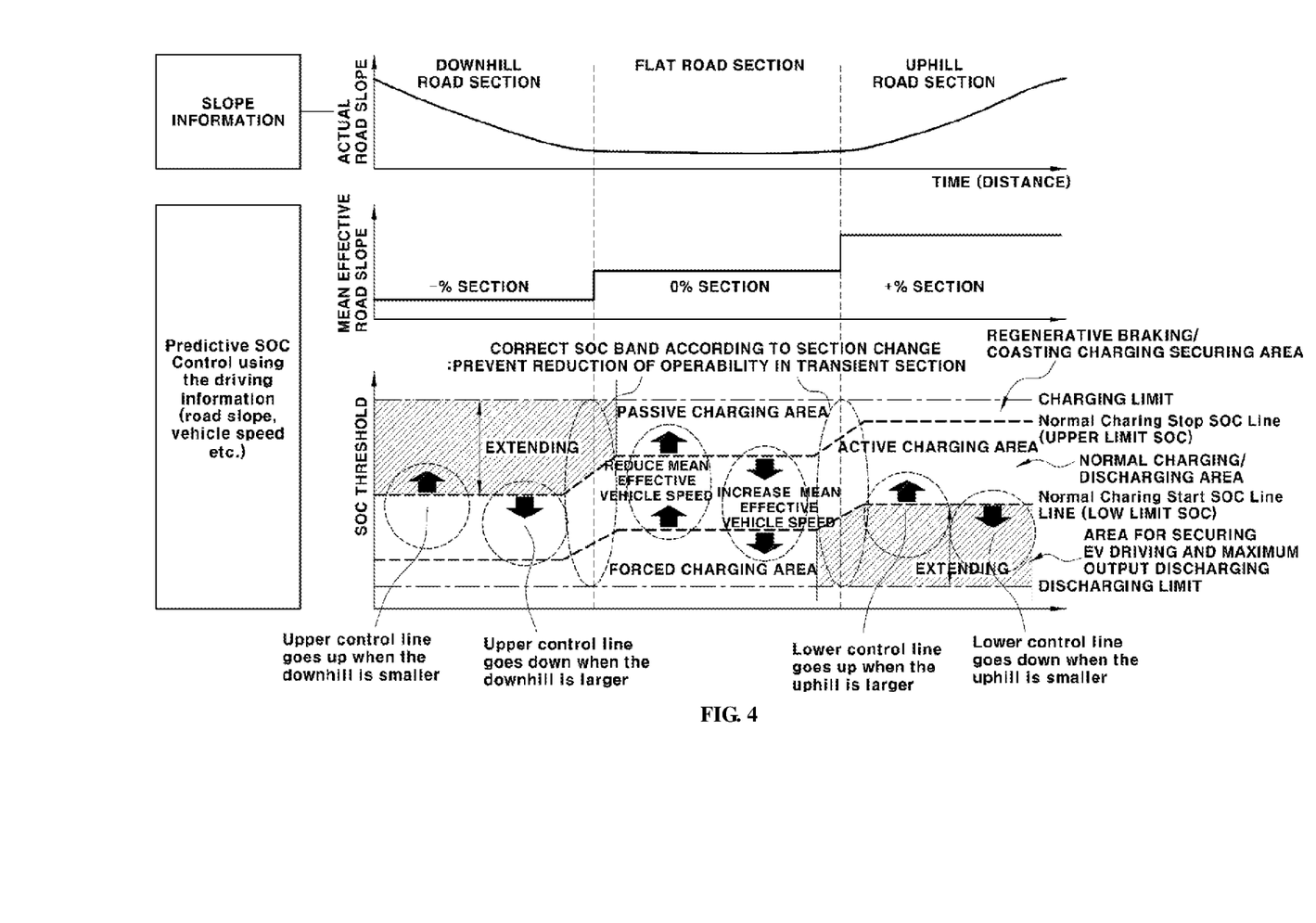
FIG. 4 is a view illustrating a control state according to a road slope and a vehicle speed that is driving information in a method for controlling batter SOC according to an exemplary embodiment of the present invention.

FIG. 2 is a flowchart illustrating a process of controlling battery SOC according to an exemplary embodiment of the present invention, and FIG. 3 is a view illustrating a method of controlling battery SOC according to an exemplary embodiment of the present invention. FIG. 4 is a view illustrating a control state based on a road slope and a vehicle speed that is driving information in a method for controlling batter SOC according to an exemplary embodiment of the present invention.

Referring to FIG. 2, to describe the whole process of controlling battery SOC according to an exemplary embodiment of the present invention, the vehicle controller 40 may be configured to detect whether valid data is input from the driving information or road information collecting device 10 (S11), and may be configured to acquire the road slope information and the traffic information (i.e., the driving information or road information of the current road section) from the data input from the driving information or road information collecting device 10 (S12). In particular, the current mean effective road slope that is a mean slope value of the current road section on which a vehicle is traveling and the mean effective vehicle speed that is the traffic speed or the limited speed of a road on which a vehicle is traveling may be determined as the current average driving information or road information (S13 and S14).

Additionally, the vehicle controller 40 may be configured to receive an APS signal, a BPS signal, and a vehicle speed signal from the driving information collecting device 30 to acquire the driving information, and may be configured to receive battery information such as battery SOC from the battery controller 20 (S15). The controller may further be configured to use the driving information and the battery information to determine whether the vehicle driving area corresponds to an active charging area (S16).

In the active charging area, which is a normal charge/discharge area, charging control in which the battery is charged by the electrical equipment 51 using engine power, or discharging control in which a battery is discharged by the electrical equipment 51 to drive at an operating point of high-efficiency to maintain an engine operating point of high-efficiency while the engine is driven at an operating point of high-efficiency to maintain an engine operating point of high-efficiency may be performed while the active charge area is a regenerative braking torque and a coast regenerative torque active areas.

In response to determining that the vehicle driving area is not an active charging area but is a passive charging area (S17), the passive charging control in which the recovery of electric energy is enhanced through the drive motor may be performed through the regenerative braking torque and coasting torque control. In the passive charging area, electric energy may be recovered (secured) using the discharge-oriented control and the enhanced regenerative braking and coasting torques (variable control) while the forcible charging is limited (e.g., normal charging stop). Alternatively, in response to determining that the driving area of a vehicle is a forced charging area which is a forcible charging enhancing area to secure SOC for securing EV driving and maximum output, not the active charging area (S18), forced charging control may be performed based on a predetermined control logic.

While the vehicle is being driven, the vehicle controller 40 may be configured to determine from the driving information acquired using the driving information collecting device 30 whether the driving mode is a charge mode or a discharge mode (S19 and S20). When the driving mode is a charge mode, an active charging upper limit SOC at which discharge-oriented control starts may be calculated from the current driving information or road information (S21). When the driving mode is a discharge mode, an active charging lower limit SOC at which discharge-oriented control starts, may be calculated from the current mean effective road slope and mean effective vehicle speed (S22).

Further, the controller may be configured to determine whether a driving path to a destination set by a driver using the navigation device of a vehicle is generated (S23). When the driving path is generated, the front driving information or road information may be acquired from data input from the driving information or road information collecting device 10 (S24).

In particular, the next mean effective road slope that is a mean slope value of the front road section may be determined (S25), and a correction factor for correcting the active charging upper limit (e.g., normal charging stop) SOC or the active charging lower limit (e.g., normal charging start) SOC may be calculated from the next mean effective road slope and the residual distance to the front road section. When the correction factor is determined, the final charging upper limit SOC and charging lower limit SOC that are corrected may be determined by multiplying the charging upper limit SOC or the charging lower limit SOC by the correction factor (S26).

When no driving path is generated, since the front road information may not be determined, the charging upper limit SOC or the charging lower limit SOC of a current road calculated in operations S21 and S22 may be intactly applied to the final charging upper limit SOC or the final charging lower limit SOC without a correction. Thus, when the final charging upper limit SOC and charging lower limit SOC are determined, the charging start and the charging stop may be determined based on the upper limit SOC and the lower limit SOC according to the road slope and the vehicle speed while the vehicle is being driven, and the battery SOC may be adjusted by outputting charging/discharging commands such as charging allowance command, charging allowance SOC, charging coefficient, discharging allowance command, discharging allowance SOC, and discharging coefficient (S27).

Referring to FIG. 3, a process of determining the charging upper limit SOC and the charging lower limit SOC from the driving information such as the APS value, the BPS value and the vehicle speed, the current driving information or road information such as the road slope and the traffic speed (or limited speed) of the current road section, and the front driving information or road information such as the road slope of the front road section and the residual distance to the front road section is shown in more detail.

As shown in FIG. 3, when the current and front mean effective road slopes are determined from the road slope information, and when the mean effective vehicle speed (traffic speed and limited speed) are determined from the traffic information (or map information and imaging device sensor information), a charging upper limit SOC at which charging stops from the charge mode and a charging lower limit SOC at which charging starts from the discharge mode in the active charging area may be calculated from the current mean effective road slope and the current mean effective vehicle speed using the map.

Particularly, the charging upper limit SOC may be a SOC threshold at which predetermined normal charging control stops or the (forcible) discharge-oriented control is performed to maintain the operating point of high engine efficiency or to secure the operability in the charge mode, and the charging lower limit SOC may be a SOC threshold at which normal discharging control stops and (forcible) charge-oriented control is performed in the discharge mode.

In the map, the charging upper limit SOC and the discharging lower limit SOC on an uphill road may be set higher than those on a flat road, and the charging upper limit SOC and the charging lower limit SOC on a downhill road may be set lower than those on a flat road. Additionally, as the mean effective road slope (+ %) that is a positive value on an uphill road increases, the charging lower limit SOC may be set higher. As the mean effective road slope (− %) that is a negative value on a downhill road decreases, the charging upper limit SOC may be set lower. Additionally, as the mean effective vehicle speed on a flat road decreases, the charging upper limit SOC and the charging lower limit SOC may be set higher.

As shown in FIG. 3, the correction factor may be calculated using the map from the next mean effective road slope and the residual distance. When the correction factor is calculated, the final charging upper limit SOC may be calculated by multiplying the charging upper limit SOC determined from the current mean effective road slope and mean effective vehicle speed by the correction factor determined from the next mean effective road slope and the residual distance. Alternatively, the final charging lower limit SOC may be calculated by multiplying the charging lower limit SOC determined from the current mean effective road slope and mean effective vehicle speed by the correction factor determined from the next mean effective road slope and the residual distance.

FIG. 4 shows that the charging upper limit (e.g., normal charging stop) SOC and the charging lower limit (e.g., normal charging start) SOC change in accordance with the road slope and the vehicle speed (e.g., traffic speed or limited speed) which are driving information or road information. In this exemplary embodiment, the operability and the fuel efficiency of a hybrid electric vehicle may be improved using optimized SOC control based on the road slope and the vehicle speed.

In other words, the energy recovery rate may be improved by analyzing and determining the vehicle speed and the driving information for each road slope and thus adjusting the charging upper limit SOC into a low level in a section where the required torque is low and the regenerative braking efficiency is high. The operability and the energy efficiency may be improved by adjusting the charging lower limit SOC into a high level in a section where the required torque significantly changes and the regenerative braking efficiency is low.

In FIG. 4, actual road slopes such as downhill road sections, flat road sections, and uphill road sections are shown. Since the mean effective road slopes applied to an actual logic are mean slope values in each road section, the mean effective road slopes may be shown as constant values. The mean effective road slope in the downhill road section may be determined as a negative value (− %), and the mean effective road slope in the flat road section may be determined as zero. The mean effective road slope in the uphill road section may be determined as a positive value (+ %).

Additionally, the charging upper limit SOC and the charging lower limit SOC which are battery SOC thresholds for charge control may be adjusted between a charging limit and a discharging limit based on the road slope and the vehicle speed. In particular, a SOC band that is defined as a section between the charging upper limit SOC and the charging lower limit SOC may be adjusted between the charging limit and the discharging limit based on the road slopes (e.g., mean effective road slope) for each road section.

First, in the downhill road section, the SOC band defined as a section between the charging upper limit SOC and the charging lower limit SOC may be set low compared to the flat road section, and in the uphill road section, the SOC band may be set high compared to the flat road section. In other words, in the downhill road section, the charging upper limit SOC (e.g., a maximum value of SOC band) and the charging lower limit SOC (e.g., a minimum value of SOC band) may be set low compared to the flat road section, maximizing energy recovery upon coasting and regenerative braking by the drive motor while the vehicle is driven on a downhill road and improving the energy recovery rate and the fuel efficiency.

Further, in the uphill road section, the charging upper limit SOC and the charging lower limit SOC may be set high compared to the flat road, securing a necessary discharge amount and, when insufficient, additionally securing discharge amount through forcible charging by the HSG while the vehicle is traveling on an uphill road. Thus, the fuel efficiency and the operability may be improved.

Moreover, the optimization of the charge/discharge area may be enabled by determining the charging upper limit SOC and the charging lower limit SOC based on the mean effective road slope and the mean effective vehicle speed in all sections of uphill, downhill, and flat roads, and the fuel efficiency and the operability may be improved. In particular, in the uphill road section, as the mean effective road slope that is a positive value decreases, the charging upper limit SOC and the charging lower limit SOC may be set lower. As the mean effective road slope increases, the charging upper limit SOC and the charging lower limit SOC may be set higher.

In the flat road section, as the mean effective vehicle speed decreases, the charging upper limit SOC and the charging lower limit SOC may be set higher. As the mean effective vehicle speed increases, the charging upper limit SOC and the charging lower limit SOC may be set lower. Thus, the optimization of charge/discharge area may be achieved by correcting the SOC band based on the change of the mean effective vehicle speed.

In the downhill road section, as the mean effective road slope that is a negative value decreases, the charging upper limit SOC and the charging lower limit SOC may be set lower. As the mean effective road slope increases, the charging upper limit SOC and the charging lower limit SOC may be set higher.

Additionally, correction may be performed based on the residual distance of the current section such that the charging upper limit SOC and the charging lower limit SOC gradually become increase or decrease in a transient section that changes between a downhill road and a flat road and in a transient section that changes between a flat road and an uphill road. As shown in FIG. 4, the battery SOC at which charging is stopped may be decreased in the downhill road section, extending the energy recovery area during the regenerative braking and coasting and maximizing the amount of energy recovery. Additionally, the battery SOC at which charging starts may be increased in the uphill road section, extending the EV driving and maximum output discharge securing area.

In the uphill and low-speed road section, the amount of energy recovery may be low during the effective regenerative braking and coasting and thus the energy recovery rate may be low. Since a substantial amount of required torque is needed due to many EV driving and acceleration/deceleration sections, a high level of battery SOC may be maintained at normal times. Thus, the extension of the active charging area, the reduction of the passive charging area, the correction based on the section change of the mean effective vehicle speed and the mean effective road slope, charging output during the charge mode may be enabled.

Further, in the downhill and intermediate/high-speed road section, the amount of energy recovery may be high during the effective regenerative braking and coasting, and thus the energy recovery rate may be high. Since a minimal amount of required motor torque is needed due to minimal acceleration/deceleration sections, a low level of battery SOC may be maintained at normal times to secure the amount of regenerative braking. Thus, the reduction of the active charging area, the extension of the passive charging area, the correction based on the mean effective vehicle speed and the section change, the increase of the regenerative braking, and the increase of the motor assist torque based on the SOC may be enabled.

Figure 5:
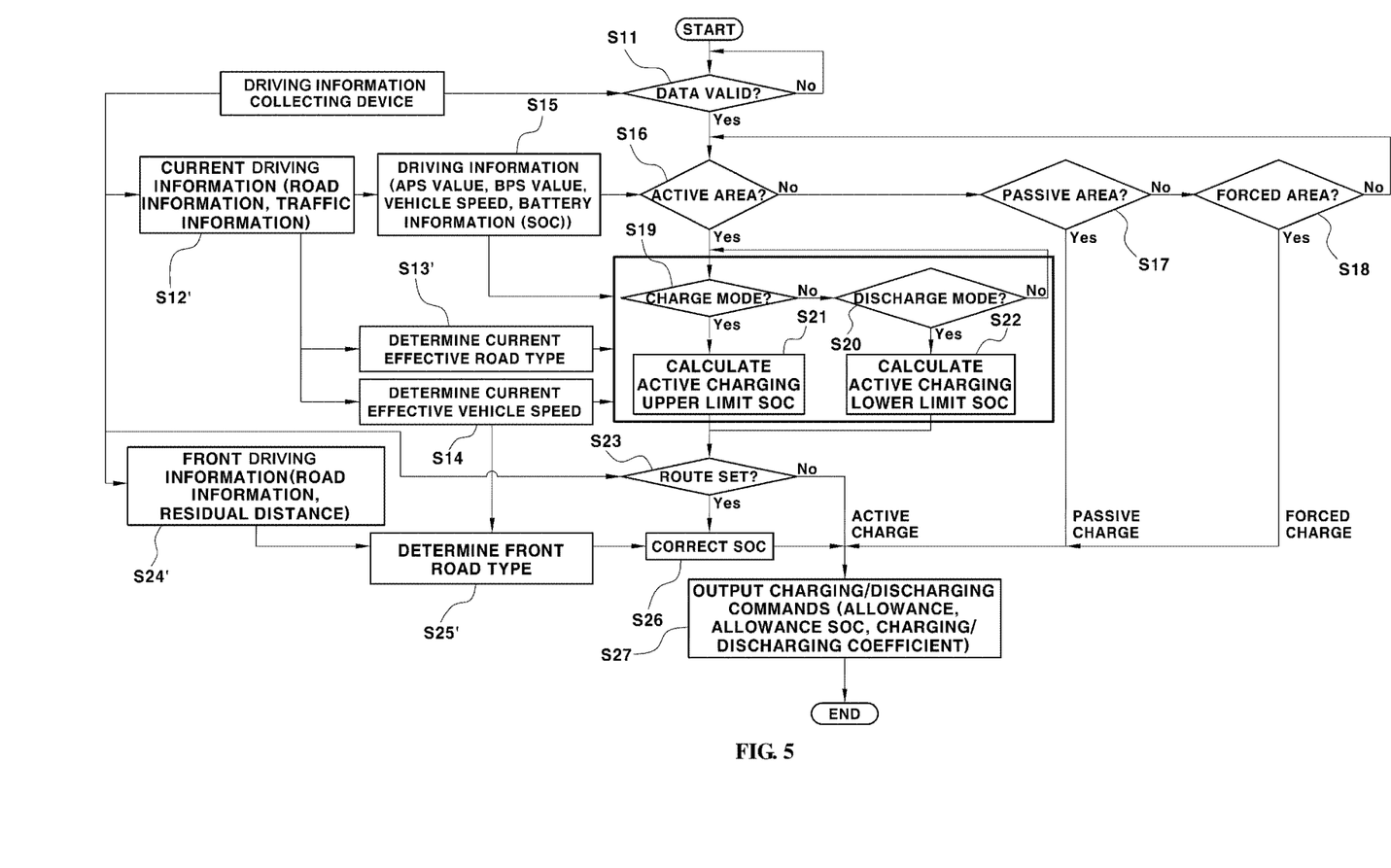
FIG. 5 is a flowchart illustrating a process of controlling battery SOC according to another exemplary embodiment of the present invention.
Figure 7:
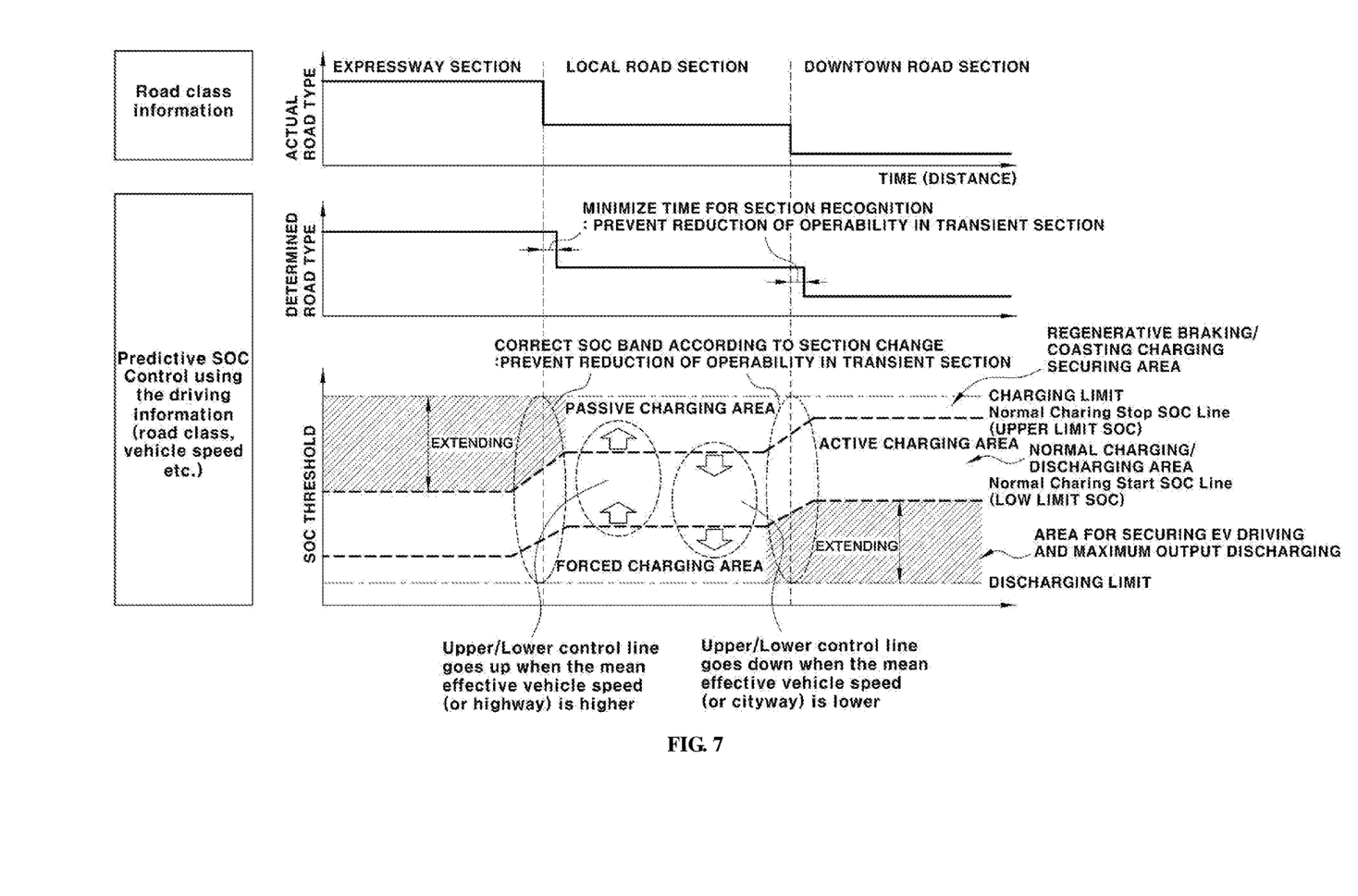
FIG. 7 is a view illustrating a control state according to a road slope and a vehicle speed that is driving information in a method for controlling batter SOC according to an exemplary embodiment of the present invention.

FIGS. 5 and 7 are view illustrating another exemplary embodiment of the present invention. In this exemplary embodiment, road type information may be used as the driving information or road information instead of the road slope information. The road type may be classified into at least two types of downtown roads, local roads, expressways, and highways. The road type information may include the road type of the current road section on which a vehicle is traveling and the road type of the front road section (e.g., a road section ahead of where the vehicle is traveling).

In another as the driving information or road information embodiment, the road type of the current road section and the road type of the front road section may be determined from data delivered from the driving information or road information collecting device 10 to the vehicle controller 40. When the vehicle controller 40 detects the location of a vehicle from a GPS signal received from GPS receiver 11, the road type of the road section may be determined from the map information stored in the data storage unit 12 based on the location of a vehicle.

Additionally, when a driver sets a destination on a navigation device and then a driving path to a destination is generated, the road type information on the driving path may be acquired from 3D map data. In particular, the road on the driving path may be divided into different sections, and the road type information for each section may be acquired. In this exemplary embodiment, the road type information of a road section (e.g., road section corresponding to the detected location of a vehicle) on which a vehicle is currently traveling, and the road type information of the front road section adjacent or proximate to the current road section may be acquired and used.

Hereinafter, in this disclosure, the road type of the current road section will be referred to as a 'current road class', and the road type of the front road section will be referred to as a 'next road class'.

Referring to FIG. 5, to describe the whole process of controlling battery SOC according to another exemplary embodiment of the present invention, the vehicle controller 40 may be configured to determine whether valid data is input from the driving information or road information collecting device 10 (S11), and may be configured to acquire the road information and the traffic information from the data input from the driving information or road information collecting device 10 (S12'). In particular, the validity of the data may be determined by determining a first valid data (e.g., non-driving state) based on an idling status using a driving information transmitting device, GPS status, destination statue, driving path status, or a system error. Then, the controller may be configured to determine a second valid data (e.g., driving state) by comparing or detecting whether current driving information is repeated at each receiving period or the corresponding signal transmitting the same value for a particular period of time.

In particular, the current road class on which a vehicle is traveling may be determined as one of downtown roads, local roads, expressways and highways (S13'), and the mean effective vehicle speed that is a traffic speed or a limited speed of a road on which a vehicle is traveling may be determined (S14). Additionally, the vehicle controller 40 may be configured to receive an APS signal, a BPS signal, and a vehicle speed signal from the driving information collecting device 30 to acquire the driving information, and may be configured to receive battery information such as battery SOC from the battery controller 20 (S15). Additionally, the controller may be configured to use the driving information and the battery information to determine whether the vehicle driving area corresponds to an active charging area (S16).

In the active charging area, which is a normal charge/discharge area, charging control in which the battery is charged by the electrical equipment 51 using engine power, or discharging control in which a battery is discharged by the electrical equipment 51 to drive at an operating point of high-efficiency to maintain an engine operating point of high-efficiency while the engine is driven at an operating point of high-efficiency to maintain an engine operating point of high-efficiency may be performed while the active charge area is a regenerative braking torque and a coast regenerative torque active areas.

In response to determining that the vehicle driving area is not an active charging area but is a passive charging area (S17), the passive charging control in which the recovery of electric energy is enhanced by the drive motor may be performed through the regenerative braking torque and coasting torque control. In the passive charging area, electric energy may be recovered by the discharge-oriented control and the enhanced regenerative braking and coasting torques while the forcible charging is limited. Alternatively, in response to determining that the driving area of a vehicle is a forced charging area which is a forcible charging enhancing area to secure SOC for securing EV driving and maximum output, not the active charging area (S18), forced charging control may be performed based on a predetermined control logic.

Furthermore, while the vehicle is traveling, the vehicle controller 40 may be configured to determine from the driving information acquired through the driving information collecting device 30 whether the driving mode is a charge mode or a discharge mode (S19 and S20). When the driving mode is a charge mode, an active charging upper limit SOC at which discharge-oriented control starts may be calculated from the current driving information or road information (S21). When the driving mode is a discharge mode, an active charging lower limit SOC at which charge-oriented control starts may be calculated from the current road class and the mean effective vehicle speed (S22).

The controller may further be configured to determine whether a driving path to a destination set by a driver using the navigation device of a vehicle is generated (S23). When the driving path is generated, the front driving information or road information may be acquired from data input from the driving information or road information collecting device 10 (S24').

In particular, the next road class may be determined (S25'), and a correction factor for correcting the active charging upper limit (normal charging stop) SOC or the active charging lower limit SOC may be calculated from the next road class and the residual distance to the front road section. When the correction factor is determined, the final charging upper limit SOC and charging lower limit SOC that are corrected may be determined by multiplying the charging upper limit SOC or the charging lower limit SOC by the correction factor (S26). When no driving path is generated, since the front road information may not be determined, the charging upper limit SOC or the charging lower limit SOC of a current road calculated in operations S21 and S22 may be intactly applied to the final charging upper limit SOC or the final charging lower limit SOC without a correction.

Thus, when the final charging upper limit SOC and charging lower limit SOC are determined, the charging start and the charging stop may be determined based on the upper limit SOC and the lower limit SOC according to the road class and the vehicle speed while the vehicle is being driven. In addition, the battery SOC may be adjusted by outputting charging/discharging commands such as charging allowance command, charging allowance SOC, charging coefficient, discharging allowance command, discharging allowance SOC, and discharging coefficient (S27).

Figure 6:
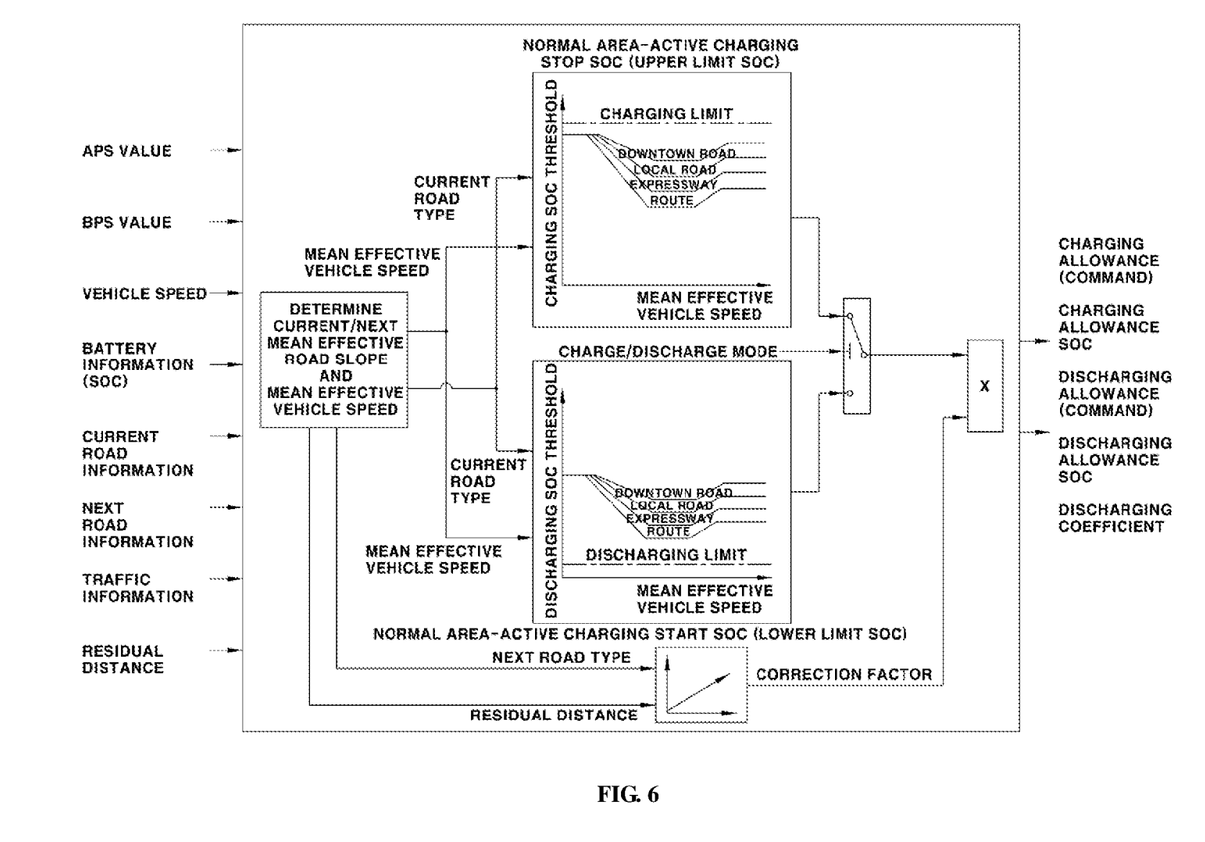
FIG. 6 is a view illustrating a method of controlling battery SOC according to another exemplary embodiment of the present invention.

Referring to FIG. 6, a process of determining the charging upper limit SOC and the charging lower limit SOC from the driving information such as the APS value, the BPS value and the vehicle speed, the current driving information or road information such as the road class and the traffic speed of the current road section, and the front driving information or road information such as the road class of the front road section and the residual distance to the front road section is shown in more detail.

As shown in FIG. 6, when the current and front road classes are determined from the road information, and when the mean effective vehicle speed are determined from the traffic information (or map information and imaging device sensor information), a charging upper limit SOC at which charging stops and a charging lower limit SOC at which charging starts in the active charging area may be calculated from the current road class and the current mean effective vehicle speed using the map that is set information.

Particularly, the charging upper limit SOC may be an SOC threshold value in which predetermined normal charging control stops and (forcible) discharge-oriented control may be performed to maintain an operating point of high engine efficiency in the charge mode or to secure the operability. In the map, the charging upper limit SOC and the charging lower limit SOC may be set to decrease in the order of downtown roads, local roads, expressways, and highways. As the mean effective vehicle speed on a local road decreases, the charging upper limit SOC and the charging lower limit SOC may be set higher (e.g., may increase).

As shown in FIG. 6, the correction factor may be calculated using the map from the next road class and the residual distance. When the correction factor is calculated, then the final charging upper limit SOC may be calculated by multiplying the charging upper limit SOC determined from the current road class and mean effective vehicle speed by the correction factor determined from the next road class and the residual distance. Alternatively, the final charging lower limit SOC may be calculated by multiplying the charging lower limit SOC determined from the current road class and mean effective vehicle speed by the correction factor determined from the next road class and the residual distance.

FIG. 7 shows that the charging upper limit SOC and the charging lower limit SOC change based on the road class and the vehicle speed which are driving information or road information. In this exemplary embodiment, the operability and the fuel efficiency of a hybrid electric vehicle may be improved using optimized SOC control according to the road class and the vehicle speed.

In other words, the energy recovery rate may be improved by analyzing and determining the vehicle speed and the driving information for each road class and thus adjusting the charging upper limit SOC into a low level in a section where the required torque is low and the regenerative braking efficiency is high. The operability and the energy efficiency may be improved by adjusting the charging lower limit SOC into a high level in a section where the required torque significantly changes and the regenerative braking efficiency is low.

Additionally, the charging upper limit SOC and the charging lower limit SOC which are battery SOC thresholds for charge control may be adjusted between a charging limit and a discharging limit based on the road class and the vehicle speed. In particular, a SOC band that is defined as a section between the charging upper limit SOC and the charging lower limit SOC may be adjusted between the charging limit and the discharging limit based on the road classes for each road section.

First, in the expressway section, the SOC band defined as a section between the charging upper limit SOC and the charging lower limit SOC may be set low compared to the local road section, and in the downtown road section, the SOC band may be set high compared to the local road section. In other words, in the expressway section, the charging upper limit SOC and the charging lower limit SOC may be set low compared to the local road section, maximizing energy recovery upon coasting and regenerative braking by the drive motor while the vehicle is being driven on an expressway and improving the energy recovery rate and the fuel efficiency.

In the downtown road section, the charging upper limit SOC and the charging lower limit SOC may be set high compared to the local road, securing a necessary discharge amount and, when insufficient, additionally securing discharge amount through forcible charging by the HSG while the vehicle is being driven on a downtown road. Thus, EV driving may be increased, and the fuel efficiency and the operability may be improved. The optimization of the charge/discharge area may be enabled by determining the charging upper limit SOC and the charging lower limit SOC based on the mean effective vehicle speed in the local road section (e.g., set SOC band according to mean effective vehicle speed), and the fuel efficiency and the operability may be improved.

Particularly, as the mean effective vehicle speed decreases in the local road section, the charging upper limit SOC and the charging lower limit SOC may be set higher. As the mean effective vehicle speed increases, the charging upper limit SOC and the charging lower limit SOC may be set lower. Thus, the optimization of charge/discharge area may be achieved by correcting the SOC band based on the change of the mean effective vehicle speed.

Additionally, the charging upper limit SOC and the charging lower limit SOC may be set to gradually increase or decrease in a transient section that changes between an expressway and a local road and in a transient section that changes between a local road and a downtown road. In other words, as shown in FIG. 7, the battery SOC at which charging is stopped may be decreased in the expressway section, extending the energy recovery area during the regenerative braking and coasting and maximizing the amount of energy recovery.

In the uphill road section, the battery SOC at which charging starts may be increased in the downtown road section where vehicle congestion and vehicle stop are frequent, extending the EV driving and maximum output discharge securing area. In the downtown and low-speed road sections, the travelling distance for a single driving section may be short (e.g., minimal due to frequent stops), and the amount of energy recovery may be low during the effective regenerative braking and coasting and thus the energy recovery rate may be low. Since a substantial amount of required torque is needed due to many EV driving and acceleration/deceleration sections, a high level of battery SOC may be maintained at normal times. Thus, the extension of the active charging area, the reduction of the passive charging area, the correction based on the change of the mean effective vehicle speed and the road class section, charging output during the charge mode may be enabled.

In the intermediate/high-speed road sections such as highways and expressways, the travelling distance for a single driving section (e.g., running section) may be long (e.g., due to less frequent stops), and the amount of energy recovery may be high during the effective regenerative braking and coasting and thus the energy recovery rate may be high. Since a minimal of required motor torque is needed due to minimal acceleration/deceleration sections, a low level of battery SOC may be maintained at normal times to secure the amount of regenerative braking. Thus, the reduction of the active charging area, the extension of the passive charging area, the correction based on the mean effective vehicle speed and the section change, the increase of the regenerative braking, and the increase of the motor assist torque based on the SOC may be enabled.

Accordingly, the present invention may enable the efficient use of energy, the maximization of energy recovery by a motor, and the improvement of fuel efficiency and operability without the improvement of capacity and performance of electrical equipment (e.g., drive motor, Hybrid Starter and Generator (HSG), etc.) or a main battery in a hybrid electric vehicle. The present invention may improve the fuel efficiency by maximizing energy recovered by a motor upon braking or coasting of a vehicle on a downhill road, a highway, or middle/high-speed driving sections.

Additionally, the present invent may improve both operability and fuel efficiency by sufficiently securing the motor output while the vehicle is traveling on an uphill road or in a downtown or while the vehicle is being driven in a low-speed and congested section, thereby securing a rapid response performance with respect to a substantial amount of required torque upon a steep slope or rapid acceleration and increasing the EV travelling distance.

Furthermore, the present invention may prevent reduction of operability and fuel efficiency by predicting the front slope, road type and traffic situation and thus minimizing the transient state based on the change of vehicle speed, road type, or road slope. In addition, the present invention may improve the durability of a main battery and prevent the driving disabled state of a vehicle, by predicting and restricting excess of predetermined charge and discharge limits during the charge of the main battery.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. An apparatus for controlling battery state of charge (SOC) in a hybrid electric vehicle, comprising:
    a driving information or road information collecting device configured to detect driving information and road information including information regarding a road slope or a road type and information regarding a speed of the vehicle; and
    a vehicle controller configured to determine a charge mode and a discharge mode based on the driving information and determine a charging upper limit SOC and a charging lower limit SOC based on the road slope information or the road type information of a road section on which the vehicle is traveling and the vehicle speed information in the road section, to output a charge command or a discharge command with respect to a drive motor and a hybrid starter and generator (HSG) based on the charging upper limit SOC where battery charging stops in the charge mode and the charging lower limit SOC where battery charging starts in the discharge mode,
    wherein the charging upper limit SOC and the charging lower limit SOC are battery SOC thresholds for charge control and are adjusted between a charging limit and a discharging limit based on the road slope or the road type and the speed of the vehicle, and
    wherein a SOC band that is defined as a section between the charging upper limit SOC and the charging lower limit SOC is adjusted between the charging limit and the discharging limit based on the road slope or the road type and the speed to the vehicle for each road section.

2. The apparatus of claim 1, wherein the driving information or road information collecting device includes:
    a global positioning system (GPS) receiver configured to receive a GPS signal;
    a data storage unit configured to store map information; and
    an information receiver configured to receive traffic information from an external traffic information providing system,
    wherein the vehicle controller is configured to:
    detect a location of the vehicle from the GPS signal received by the GPS receiver;
    acquire information regarding the road slope or the road type of the road section on which a vehicle is currently traveling, based on the location of the vehicle detected from the map information; and
    acquire, as information regarding the vehicle speed of the road section, a traffic speed determined based on a real-time traffic of the road section on which the vehicle is currently traveling, based on the detected location of the vehicle.

3. The apparatus of claim 2, wherein the vehicle controller is configured to use a current mean effective road slope that is a mean slope value of the road section on which a vehicle is currently traveling as the road slope information to calculate the charging upper limit SOC and the charging lower limit SOC.

4. The apparatus of claim 1, wherein the vehicle controller is configured to determine the charging upper limit SOC and the charging lower limit SOC from the road slope or the road type of the road section and the vehicle speed of the road section, using a map for each road section.

5. The apparatus of claim 4, wherein the vehicle controller is configured to acquire a limited speed of the road section on which the vehicle is currently traveling as the vehicle speed in the road section when the traffic information is not received from the external traffic information providing system.

6. The apparatus of claim 5, wherein the limited speed is obtained as a limited speed set on a road that corresponds to the location of the vehicle from the map information.

7. The apparatus of claim 5, wherein the driving information or road information collecting device further includes:
    an imaging device sensor configured to photograph a traffic sign marked with the limited speed while the vehicle is traveling; and
    a sensor controller configured to extract the limited speed from an image photographed by the imaging device sensor using character recognition,
    wherein the vehicle controller is configured to acquire the limited speed delivered from the sensor controller as the vehicle speed information.

8. The apparatus of claim 1, wherein when a driving path to a destination is generated using a navigation device in a vehicle, the vehicle controller is further configured to:
    acquire information regarding the road slope or the road type of a front road section adjacent to the current road section and information regarding a residual distance to the front road section through the driving information or road information collecting device;
    acquire a correction factor determined based on the road slope or the road type and the residual distance of the front road section; and
    use a final charging upper limit SOC and a final charging lower limit SOC obtained by correcting the charging upper limit SOC and the charging lower limit SOC using the correction factor.

9. The apparatus of claim 1, wherein the road type information includes at least two road types of a downtown road, a local road, an expressway, and a highway.

10. A method for controlling battery state of charge (SOC) in a hybrid electric vehicle, comprising:
    acquiring, by a controller, from data delivered from a driving information or road information collecting device, driving information and road information including information regarding a road slope or a road type and information regarding a speed of the vehicle;

determining, by the controller, a charge mode and a discharge mode based on the driving information;

determining, by the controller, in a charge mode, a charging upper limit SOC based on the road slope information and road type information of a road section on which a vehicle is currently traveling and the vehicle speed information in the road section;

determining, by the controller, in a discharge mode, a charging lower limit SOC based on the road slope information and the road type information of the road section and the vehicle speed information in the road section; and outputting, by the controller, a charge command or a discharge command with respect to a drive motor and a hybrid starter and generator (HSG) based on the charging upper limit SOC where battery charging stops in the charge mode or the charging lower limit SOC where battery charging starts in the discharge mode, wherein the charging upper limit SOC and the charging lower limit SOC are battery SOC thresholds for charge control and are adjusted between a charging limit and a discharging limit based on the road slope or the road type and the speed of the vehicle, and wherein a SOC band that is defined as a section between the charging upper limit SOC and the charging lower limit SOC is adjusted between the charging limit and the discharging limit based on the road slope or the road type and the speed to the vehicle for each road section.

11. The method of claim 10, wherein the acquiring of the driving information or road information includes:

detecting, by the controller, a location of the vehicle from a global positioning system (GPS) signal received by a GPS receiver;

receiving, by the controller, traffic information from an external traffic information providing system;

acquiring, by the controller, information regarding the road slope or the road type of the road section on which a vehicle is currently traveling, based on the location of the vehicle detected from map information of a data storage unit; and acquiring, by the controller, as information regarding the vehicle speed of the road section, a traffic speed determined based on a real-time traffic of the road section on which the vehicle is currently traveling, based on the location of the vehicle detected from the traffic information.

12. The method of claim 11, wherein a current mean effective road slope that is a mean slope value of the road section on which the vehicle is currently traveling as the road slope information is used to calculate a charging upper limit SOC and a charging lower limit SOC.

13. The method of claim 12, wherein the charging upper limit SOC and the charging lower limit SOC are determined using a map for each road section from the road slope or the road type of the road section and the vehicle speed of the road section.

14. The method of claim 13, wherein a limited speed of the road section on which the vehicle is currently traveling is acquired as the vehicle speed in the road section when the traffic information is not received from the external traffic information providing system.

15. The method of claim 14, wherein when an actual current running speed is different from a limited speed by a certain degree or more, all of the traffic information and the limited speed of provided even though the running formation collecting device provides the traffic information and the limited speed on the road, the mean vehicle speed for a certain time is acquired as the vehicle speed in the road section from a vehicle speed detector configured to detect the current speed of the vehicle.

16. The method of claim 14, wherein the limited speed is obtained as a limited speed set on a road that corresponds to the location of the vehicle detected from the map information.

17. The method of claim 14, wherein when an imaging device sensor photographs a traffic sign marked with a limited speed while the vehicle is traveling, the limited speed is obtained as the limited speed extracted from an image photographed by the imaging device sensor using character recognition.

18. The method of claim 10, when a driving path to a destination is generated using a navigation device in the vehicle, the method further comprises:

acquiring, by the controller, information regarding the road slope or the road type of a front road section adjacent to the current road section and information regarding a residual distance to the front road section through the driving information or road information collecting device;

acquiring, by the controller, a correction factor determined based on the road slope or the road type and the residual distance of the front road section; and using, by the controller, a final charging upper limit SOC and a final charging lower limit SOC which are obtained by correcting the charging upper limit SOC and the charging lower limit SOC using the correction factor.

19. The method of claim 13, wherein the charging upper limit SOC and the charging lower limit SOC of an uphill road are set higher compared to a flat road, and the charging upper limit SOC and the charging lower limit SOC of a downhill road are set lower compared to a flat road.

20. The method of claim 19, wherein as a mean effective road slope that is a positive value on an uphill road increases, the charging lower limit SOC is set higher, and as a mean effective road slope that is a negative value on a downhill road decreases, the charging upper limit SOC is set lower.

* * * * *